United States Patent
Woodberg et al.

(10) Patent No.: US 11,689,500 B2
(45) Date of Patent: Jun. 27, 2023

(54) SYSTEMS AND METHODS FOR IP MASS HOST VERIFICATION

(71) Applicant: Proofpoint, Inc., Sunnyvale, CA (US)

(72) Inventors: Bradley Scott Woodberg, Plymouth, MI (US); Doyle Joseph Groves, Noblesville, IN (US)

(73) Assignee: Proofpoint, Inc., Sunnyvale, CA (US)

(*) Notice: Subject to any disclaimer, the term of this patent is extended or adjusted under 35 U.S.C. 154(b) by 0 days.

(21) Appl. No.: 17/217,880

(22) Filed: Mar. 30, 2021

(65) Prior Publication Data

US 2022/0239625 A1 Jul. 28, 2022

Related U.S. Application Data

(60) Provisional application No. 63/141,774, filed on Jan. 26, 2021.

(51) Int. Cl.
*H04L 29/12* (2006.01)
*H04L 12/26* (2006.01)
(Continued)

(52) U.S. Cl.
CPC .......... *H04L 61/5046* (2022.05); *H04L 43/16* (2013.01); *H04L 61/25* (2013.01); *H04L 61/4511* (2022.05); *H04L 61/4552* (2022.05)

(58) Field of Classification Search
CPC . H04L 61/2046; H04L 43/16; H04L 61/1511; H04L 61/1552; H04L 61/25;
(Continued)

(56) References Cited

U.S. PATENT DOCUMENTS 8,219,709 B2 * 7/2012 Hughes .............. H04L 61/1564
709/245
9,391,949 B1 * 7/2016 Richardson ......... H04L 61/1511
(Continued)

FOREIGN PATENT DOCUMENTS

EP           3407572 A1 * 11/2018  .......... H04L 61/1511
WO    WO-2006094271 A2 *  9/2006  .......... H04L 63/1408
WO    WO-2015065380 A1 *  5/2015  .......... H04L 61/1511

OTHER PUBLICATIONS

European Search Report issued for EP Application No. 21177873.3, dated Nov. 5, 2021, 8 pages.
(Continued)

*Primary Examiner* — Patrice L Winder
(74) *Attorney, Agent, or Firm* — Sprinkle IP Law Group (57) ABSTRACT

Systems, methods and products for identifying IP mass hosts and determining whether they are good or bad. One embodiment is a method including selecting a first candidate IP address, identifying a set of domains hosted at the IP address, and identifying registrants of the domains. A number of unique ones of the registrants is determined and if the number of unique registrants exceeds a threshold number, the candidate IP address is deemed an IP mass host. Otherwise, the candidate IP address is deemed not to be an IP mass host. For an IP mass host, domains that have bad reputations are identified, and it is determined whether the bad domains comprise at least a threshold percentage of the total hosted domains. If the IP mass host has at least the threshold percentage of bad domains, the IP mass host is deemed a bad mass host.

20 Claims, 7 Drawing Sheets

(51) Int. Cl.
*H04L 61/5046* (2022.01)
*H04L 61/4511* (2022.01)
*H04L 61/4552* (2022.01)
*H04L 43/16* (2022.01)
*H04L 61/25* (2022.01)

(58) Field of Classification Search
CPC ............. H04L 63/1433; H04L 63/1491; H04L 63/1483
See application file for complete search history.

(56) References Cited

U.S. PATENT DOCUMENTS

| | | | | |
|---|---|---|---|---|
| 10,104,103 | B1* | 10/2018 | Beaumont | H04L 63/1425 |
| 10,911,477 | B1* | 2/2021 | Kharraz | H04L 63/1441 |
| 2007/0130316 | A1* | 6/2007 | Turakhia | G06Q 30/02 |
| | | | | 709/224 |
| 2008/0270209 | A1* | 10/2008 | Mauseth | G06Q 10/10 |
| | | | | 705/7.29 |
| 2009/0089859 | A1 | 4/2009 | Cook et al. | |
| 2015/0213131 | A1* | 7/2015 | Styler | H04L 61/1511 |
| | | | | 707/767 |
| 2019/0182289 | A1* | 6/2019 | White | H04L 63/1433 |
| 2019/0199688 | A1* | 6/2019 | Wallace | H04L 63/1433 |
| 2021/0014252 | A1* | 1/2021 | Usher | H04L 63/1441 |
| 2021/0105304 | A1* | 4/2021 | Kraning | H04L 63/1425 |

OTHER PUBLICATIONS

Sandeep Yadav et al., "Detecting Algorithmically Generated Malicious Domain Names," Proceedings of the 10th Annual Conference on Internet Measurement, Nov. 1, 2020, pp. 48-61.

Pawan Prakash et al., "PhishNet: Predictive Blacklisting to Detect Phishing Attacks," Infocom 2020 Proceedings IEEE, Mar. 14, 2010, pp. 1-5.

* cited by examiner

------------------------------------------
 passive dns lookups matching that IP: 1
------------------------------------------ new     1       slsknet.org     Domain
Privacy Group

------------------------------------------
       unique hostnames seen: 1
         unique domains seen: 1
unique registrant orgs seen: 1
------------------------------------------
```

------------------------------------------
 passive dns lookups matching that IP: 8
------------------------------------------ new     1       webcindario.com    <no-reg-org>
new     2       webcindario.com    <no-reg-org>
new     3       webcindario.com    <no-reg-org>
new     4       forms-google.cf    <no-reg-org>
new     5       google-acounts.cf  <no-reg-org>
new     6       meliorem.mx        <no-reg-org>
new     7       webcindario.com    <no-reg-org>
new     8       webcindario.com    <no-reg-org>

------------------------------------------
       unique hostnames seen: 8
         unique domains seen: 4
unique registrant orgs seen: 1
```

FIG. 5

```
for 193.141.3.73:

new     1       dallenbene.de           <no-reg-org>
new     2       kreitnaa.com            <no-reg-org>
new     3       comonistas-mex.org      <no-reg-org>
new     4       hk-handal.com           <no-reg-org>
new     5       primejurist.nl          <no-reg-org>
new     6       controdictio.de         fauxorg llc
new     7       seaulify.net            <no-reg-org>
new     8       edocation-bond.org      <no-reg-org>
new     9       maziekopdepabo.nl       <no-reg-org>
new     10      nejmegbrigade.nl        <no-reg-org>
new     11      lawgluten.org           <no-reg-org>
new     12      strenze.com             <no-reg-org>
new     13      backerei-marx.de        <no-reg-org>
new     14      busfrankfurt.de         Acme Corp
new     15      dokor-catering.eu       <no-reg-org>
new     16      weworktravel.com        <no-reg-org>
new     17      canonlands.de           <no-reg-org>
new     18      mcberlin.de             <no-reg-org>
new     19      venezuelaparel.com      <no-reg-org>
new     20      gamination.nl           A. Hinson
new     21      ...
new     52      blanske.com             <no-reg-org>

-----------------------------------------------------
        unique hostnames seen: 52
          unique domains seen: 51
unique registrant orgs seen: 3
-----------------------------------------------------
```

SYSTEMS AND METHODS FOR IP MASS HOST VERIFICATION

RELATED APPLICATIONS

This application claims priority under 35 U.S.C. § 119(e) to U.S. Provisional Application No. 63/141,774, entitled "Systems and Methods for Mass IP Host Verification", filed Jan. 26, 2021, which is fully incorporated herein by reference for all purposes.

FIELD OF THE INVENTION

This invention relates generally to cybersecurity, and more particularly to systems and methods that are configured to identify IP mass hosts and determine whether mass identified hosts are "good" or "bad".

BACKGROUND

Cyberthreat protection technologies are designed to protect enterprise computing networks from attacks and threats which originate from malicious or otherwise suspicious domains and/or IP addresses. For instance, a URL of a particular domain may be included in an email message in an attempt to phish the recipient, directing the recipient's browser to the malicious URL and potentially damaging the recipient's computing environment. It may therefore be necessary to remove the malicious URL from the email message before allowing the email to be delivered to the recipients' inbox.

When a particular domain or IP address sends phishing emails or takes other malicious or suspicious actions, it may be identified as having a "bad" reputation. Some cyberthreat systems maintain lists of domains and/or IP addresses that have bad reputations, and may provide these lists to their customers. Based on these reputation lists, the customers may simply block any actions that are associated with domains or IP addresses that have bad reputations. For example, the customers may block emails that are associated with a "bad" domain or IP address.

This technique may be problematic in some situations, however. For instance, it is not unusual for a single IP address to host many domains. Such an IP address is referred to as an "IP mass host." When an enterprise chooses to block IP addresses that have bad reputations, an IP mass host may present a problem, in that if one of the domains hosted by the IP addresses is a bad domain (takes malicious or suspicious actions), the bad reputation of the domain may affect the other domains hosted by the IP address. In other words, the enterprise may wish to block the domain, but if the domain is identified by the associated IP address, the other domains hosted by the same address will be similarly identified, and will be blocked, whether they are bad or not. If most of the domains hosted by the IP address are bad, this may not be objectionable. If, however, only a small number of the domains hosted by the IP address are bad while most of them are good, it may not be desirable to block all of the good domains because of the few bad domains.

It would therefore be desirable to provide techniques for identifying IP mass hosts and determining whether the identified IP mass hosts should be considered good IP mass hosts or bad IP mass hosts.

SUMMARY OF THE DISCLOSURE

Embodiments of the invention are designed to reduce or eliminate one or more of the problems described above.

These embodiments achieve these goals by first identifying whether an IP address is an IP mass host, and if the IP address is an IP mass host, determining whether that IP mass host is good or bad.

In some embodiments, determining whether an IP address is an IP mass host is performed by identifying an IP address that may potentially be an IP mass host, examining domain name service (DNS) records for the IP address to identify domains which map to the IP address over a defined look back period, using WHOIS records to identify registrants corresponding to the identified domains, and determining whether more than a predetermined number of unique registrants are associated with the domains hosted by the IP address. If there are more than the predetermined number of unique registrants, the IP address is considered an IP mass host, otherwise it is not. In some alternative embodiments, determining whether an IP address is an IP mass host is performed in a system with SSL enabled services that uses IP mass hosting style certificates by using OpenSSL queries to determine how many domains are associated with the IP address (assuming that it is using an IP mass hosting style certificate).

If the IP address is determined to be an IP mass host, the good/bad character of the IP mass host is determined based on whether the individual domains are good or bad. Most often, the domains will include a combination of some good domains and some bad domains. In some embodiments, the number of bad domains is weighed against the number of good domains. If more than a predetermined percentage (e.g., 10%) of the hosted domains are bad, then the IP address itself is considered to be bad. If the bad domains comprise less than this predetermined percentage, the IP address itself is considered to be a good IP address, even though it hosts one or more bad domains.

One embodiment comprises a method for identifying whether an IP address is an IP mass host, including selecting a first candidate IP address, identifying a set of domains hosted at the first candidate IP address, and identifying one or more registrants of the set of domains. A number of unique registrants within the identified registrants of the domains and it is determined whether the number of unique registrants exceeds a threshold number (e.g., 1). In response to determining that the number of unique registrants exceeds the threshold number, the candidate IP address is determined to be an IP mass host. Ones of the domains that have bad reputations are then identified, and it is determined whether the identified ones of the domains that have bad reputations comprise at least a threshold percentage of the domains. In response to determining that the domains that have bad reputations comprise at least the threshold percentage of the domains, an indication that the first candidate IP address is a bad mass host is stored.

In some embodiments, selecting the first candidate IP address comprises accessing a release candidate list containing a plurality of IP addresses and selecting the first candidate IP address from the IP addresses in the release candidate list. The release candidate list may be compiled from a bad reputation list containing IP addresses that have been identified as having bad reputations.

In some embodiments, storing the indication that a candidate IP address is a bad mass host may comprise maintaining the candidate IP address on the bad reputation list.

In some embodiments, in response to determining that the ones of the plurality of domains identified as having bad reputations comprise less than the threshold percentage of the plurality of domains, the candidate IP address may be removed from the bad reputation list.

In some embodiments, the domains hosted at the first candidate IP address may be identified by accessing domain name service (DNS) records and identifying domains that map to the first candidate IP address during a defined look back period (e.g., nine months).

In some embodiments, the domains hosted at the first candidate IP address may be identified by examining an IP mass hosting style certificate corresponding to the first candidate IP address, where the IP mass hosting style certificate contains information identifying the plurality of domains.

In some embodiments, identifying the registrants of the domains associated with the candidate IP address comprises performing a WHOIS lookup for each of the identified domains and identifying from retrieved WHOIS information registrants corresponding to the domains.

One alternative embodiment comprises a system having a processor coupled to a memory, where the memory stores instructions which are executable by the processor to perform a method as described above. Another alternative embodiment is a computer program product comprising a non-transitory computer-readable medium storing instructions executable by one or more processors to perform a method as described above.

Embodiments disclosed herein may provide a number of advantages over the prior art. For example, if an enterprise blocks bad domains based on the IP address associated with the domain, a single bad domain will cause the enterprise to block any domain that uses the same IP address that is associated with the bad domain. Because the embodiments disclosed herein enable identification of IP mass hosts and determining whether the IP mass hosts are good or bad based on the percentage of the hosted domains that are bad, enterprises can use this information to block only IP mass hosts that have enough bad domains (e.g., a predetermined percentage) to justify blocking the good domains with the bad domains. The present embodiments thereby enable more focused responses to cyberthreats than the all-or-nothing response that results from blocking an IP address (IP mass host) because of only a single bad domain associated with the IP address.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments of the present invention enable the identification of IP mass hosts and the determination of whether these IP mass hosts are good or bad, depending upon the good or bad character of the domains that are hosted by the IP mass host.

For purposes of this disclosure, an "IP mass host" is an IP address that hosts multiple hostnames or domains that may be owned by different entities. A hostname is a domain which is associated with an IP address. For example, mail.abcdef.com would be a hostname, which would map to an IP address. It is necessary to perform a DNS lookup to determine if this is a hostname or if mail.abcdef.com is a subdomain (of the domain abcdef.com), since it is not possible to distinguish between the two simply by looking at the hostname or subdomain. It may be useful to note that the top level domain is the rightmost name (in the example of abcdef.com the top level domain is .com). Top level domains are useful in some systems because some top level domains may be considered to be universally bad, or the top level domains may be geo-oriented, and the customers may want to avoid top level domains corresponding to certain geographic regions.

A single IP mass host may potentially have thousands of associated domains. These domains may be owned by various different types of entities, such as hosting providers (e.g., Wordpress), content delivery networks (e.g., Akamai) and DDoS services (e.g., Cloudfront), which host multiple services at a single IP address.

An exemplary cyberthreat intelligence service builds reputation on both IP addresses and domains. "Reputation" refers to the good (benign or non-malicious) or bad (malicious or suspicious) character of an IP address or domain. If an IP address or domain "has reputation," this commonly implies that the reputation is bad.

In a system in which reputation is built on both IP addresses and domains, if a single one of the domains hosted by an IP mass host becomes infected or is deemed malicious, that domain is condemned, but the associated IP address is also condemned. A customer that uses this system to block connections based on condemned IP addresses is not aware that a particular IP address is an IP mass host, so it will block not only the bad domains associated with the IP address, but also good domains associated with the IP address.

This results in false positives for the good domains at the same IP address as the bad domain(s), which is currently the primary cause of customer reported problems for some cyberthreat intelligence services. Resolving a support ticket associated with one of these false positives (false identification of a good domain as a bad domain) involving an IP mass host conventionally requires manual review by a human analyst. Personnel associated with the cyberthreat protection system have to manually investigate and determine: 1) whether the IP address is an IP mass host; and 2) which domain under the IP mass host is actually bad. This manual process is time consuming, and the manual review is not as efficient as an automated process. Further, the manual review is not as effective as the automated processes disclosed herein. The present systems and methods provide automated processes for determining whether an P address is an IP mass host, and if so, whether the IP mass host is bad or not. As noted above, this is a huge problem for cyberthreat systems/services.

In addition to the problem of condemning the entire group of domains at the IP address of the IP mass host (potentially causing a massive take-down of domains that are good), there is the converse—the problem of identifying one of the IP mass hosts as good and "safelisting" this IP address. When an IP address is safelisted, it is identified as safe, or good, and some of the protections that would block a domain of unknown character may therefore be bypassed. If the IP address is safelisted, the IP address that hosts the domain, and all of the other domains hosted at the IP address, will conventionally also be safelisted. These domains may include bad domains, so the bad domains may effectively be safelisted merely due to the fact that they share the IP address with the known good (safelisted) domain. This false identification of a bad domain as a good, safelisted domain may be referred to as a false negative.

Yet another problem with conventional methods concerning IP mass hosts is that, even if it is known whether an IP address is an IP mass host, there is no good way to determine whether the IP mass host is a good IP mass host or a bad IP mass host. Current methods either treat the IP mass host as a bad IP mass host because it includes even a single a known bad domain, or treat the IP mass host as a good IP mass host because it includes a single safelisted domain. In either case, there may be many other domains associated with the IP mass host that have this characterization that wrongly share this reputation (good or bad), and may therefore cause false positives or false negatives.

Embodiments of the present invention provides a mechanism that can identify IP mass hosts which are on a reputation list (a "reputation list") on an IP address by IP address basis in an automated fashion as part of every reputation list update that is published. This mechanism is capable of distinguishing between IP mass hosts and non-IP mass hosts, and can also distinguish between good and bad IP mass hosts. As a result, bad IP mass hosts that are on a reputation list can be identified and retained on the reputation list.

There are several desirable outcomes that may result from the use of the present techniques in some cyberthreat protection systems. In the case of systems that maintain a reputation list, that identifies bad domains and IP addresses, but does not have sufficient granularity to identify good IP mass hosts in the reputation list, it would be desirable to simply remove the good domains from the reputation list, while retaining bad domains on the reputation list. In the case of systems that can maintain an extended reputation list, a new field can be added which identifies whether a host is an IP mass host. This would allow customers who rely on the extended reputation list to make their own decisions as to whether to include a given IP mass host on the reputation list or not. In addition to systems that use reputation lists to identify bad domains, there may be systems that use APIs or web user interfaces to leverage the present techniques to identify IP mass hosts and to determine whether IP mass hosts are good or bad.

Figure 1:
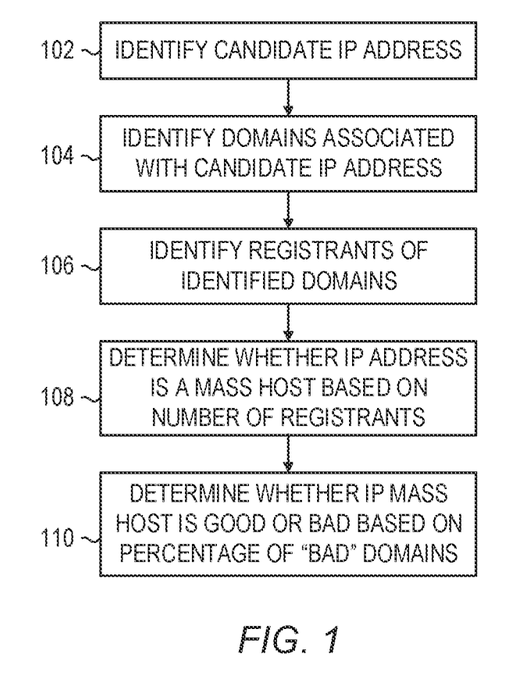
FIG. 1 is a flow diagram illustrating a method for identifying IP mass hosts in accordance with some embodiments.

Referring to FIG. 1 a flow diagram illustrating a method for identifying IP mass hosts in accordance with some embodiments is shown. This figure illustrates the steps of the method at a high level. The method begins with the identification of a candidate IP address which is to be evaluated to determine whether it is an IP mass host (step 102). The domains associated with the candidate IP address are then identified, such as by performing a passive DNS lookup of domains mapped to the IP address, or obtaining the domains from an SSL certificate (step 104). When the domains associated with the candidate IP address have been identified, the registrant associated with each of the domains is determined by, for example, performing a WHOIS lookup of each domain (step 106). It is then determined whether the candidate IP address is an IP mass host based on the number of unique registrants (step 108). If there are more than a predetermined number of registrants associated with the domains, the candidate IP address is considered an IP mass host, and otherwise it is not. If the candidate IP address is determined to be an IP mass host, the IP address is determined to be either a good mass host or a bad mass host based on the percentage of domains associated with the mass host that are bad (step 110). If more than a predetermined percentage of the domains are considered to be bad, the IP mass host is also considered to be bad. If less than the predetermined percentage of the domains are bad, the IP mass host is deemed to be good.

Figure 2:
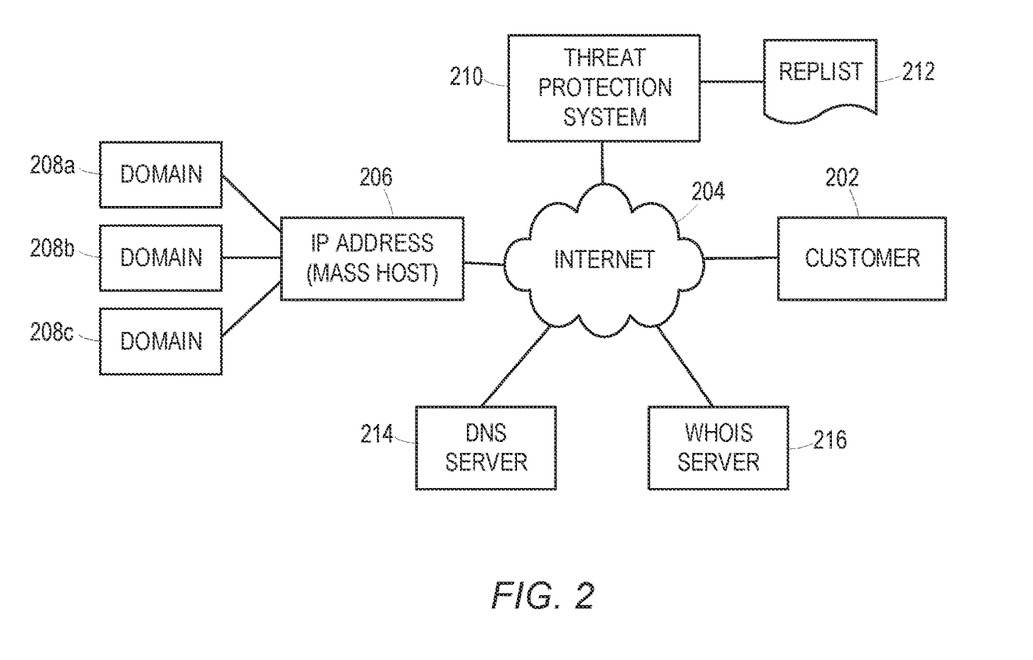
FIG. 2 is a diagram illustrating a threat protection system capable of operating in a network computing environment in accordance with some embodiments.

FIG. 2 is a diagram illustrating a threat protection system capable of operating in a network computing environment according to some embodiments. The illustrated structure of the threat protection system is intended merely to serve as an example, and alternative embodiments that have different structures may also be suitable to implement the forensics-based clustering techniques disclosed herein.

In this example, a customer 202 such as a business enterprise is communicatively connected to one or more domains 208*a*-208*c* (collectively referred to herein by reference number 208) through a network 204 such as the internet. Each of domains 208 is hosted by an IP mass host 206 that has a corresponding IP address. Since each of domains 208 is hosted by IP mass host 208, each of the domains has the same IP address. Consequently, whenever one of domains 208 (a bad actor) takes some malicious action, customer 202 can only identify it as having originated from the IP address associated with the bad actor. The customer cannot distinguish which one of the domains hosted at the IP address (of domains 208*a*, 208*b*, 208*c*) is the bad actor.

Customer 202 may engage threat protection system 210, which provides services to protect the customer against threats posed by domains 208. Threat protection system 210 in this embodiment maintains a reputation list 212 which identifies malicious or suspicious domains, potentially including any one of domains 208 that are hosted at IP address 206. Threat protection system 210 is configured to examine candidates on reputation list 212 to determine whether these candidates can be released from the reputation list so that good domains are not unnecessarily blocked because they are on the reputation list.

Threat protection system 210 may identify a candidate IP address from the reputation list and examine passive DNS data from DNS server 214 to determine how many domains have been mapped to this IP address over some recent look back period. For each of the domains that is identified during this process, the threat protection system performs a WHOIS lookup of the domain using WHOIS server 216 to identify a corresponding registrant of the domain.

The registrant is the organization that registers the domain. Multiple domains can be registered to the same registrant if they are owned by the same owner (e.g., a person or entity). When multiple domains are registered by the same registrant, they are treated for the purposes of this disclosure as having the same owner.

The threat protection system then determines from the WHOIS lookup information how many unique registrants are associated with the domains hosted by the candidate IP address. If there is only a single registrant, the IP address is not considered an IP mass host, so it is retained on the reputation list. If there is more than a single registrant, the IPS is considered an IP mass host, so the threat protection system determines whether the IP address corresponds to a good IP mass host, or a bad IP mass host.

In one embodiment, this is accomplished by determining the number of bad domains that are hosted at the IP address of the IP mass host. If the bad domains comprise at least a predetermined percentage of the hosted domains, then the IP mass host is considered to be bad, and the IP address would be retained on the reputation list. Otherwise, the IP mass host is considered to be good, and the IP address would be removed from the reputation list.

Figure 3:
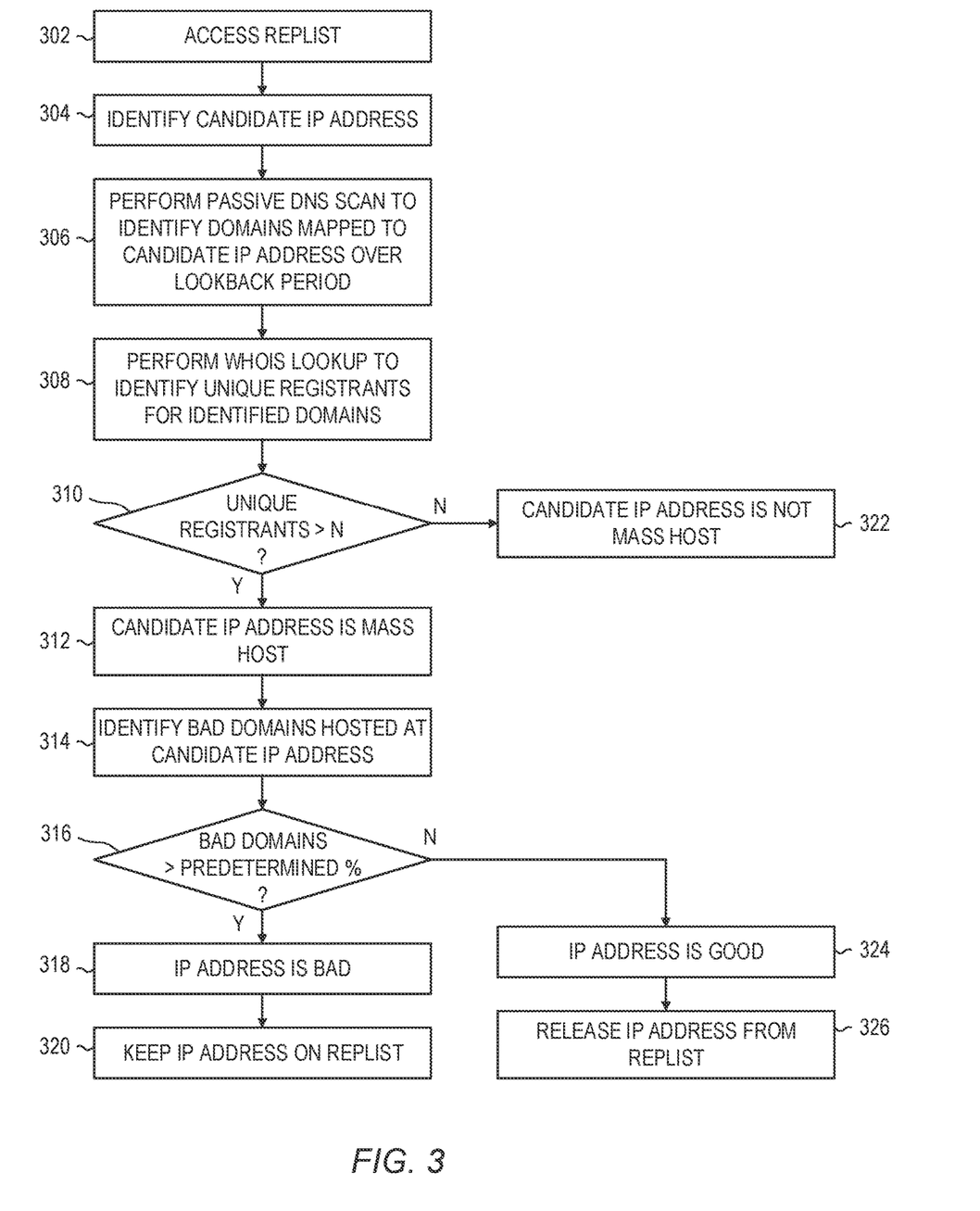
FIG. 3 is a flow diagram illustrating a method for method for identifying IP mass hosts and determining whether the IP mass hosts are good or bad in accordance with some embodiments.

Referring to FIG. 3, a flow diagram illustrating a method for method for identifying IP mass hosts and determining whether the IP mass hosts are good or bad in accordance with one embodiment is shown.

As noted above, this method is implemented in connection with a threat protection system that maintains a reputation list, or list of IP addresses that have bad reputations. This list is used by customers of the threat protection system to determine which IP addresses and domains should be blocked as a result of malicious or suspicious activity by the IP addresses or domains. The first step in the method is to access the reputation list (step 302) and to identify a candidate IP address from the reputation list (step 304). This candidate will be examined to determine whether it should be retained on the reputation list, or released from the reputation list.

At step 306, a passive DNS scan is performed for the candidate IP address to identify domains that map to the candidate IP address. Because the activity which is associated with an IP address may change over time, older information is not as relevant as newer information, so the system is concerned with the activity that occurs only within a predetermined interval, or "look back period". For example, in one embodiment, the system looks up only the domains that map to the IP address within the preceding nine months (the look back period).

Figure 4:
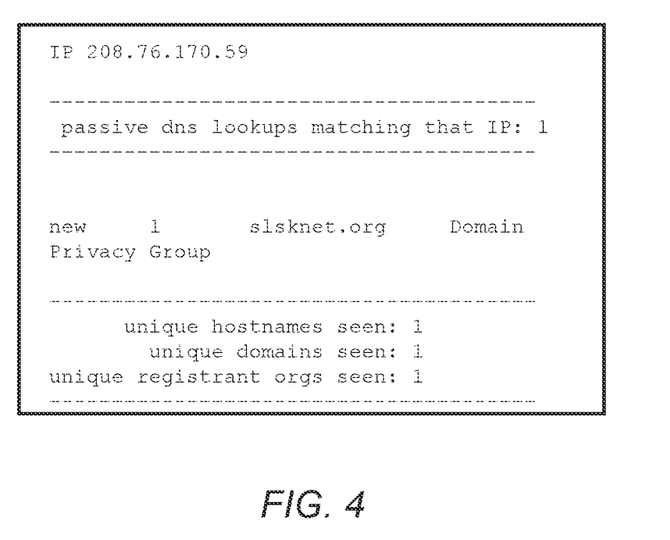
FIG. 4 illustrates an example of a single domain with a single indicated registrant in accordance with some embodiments.
Figure 5:
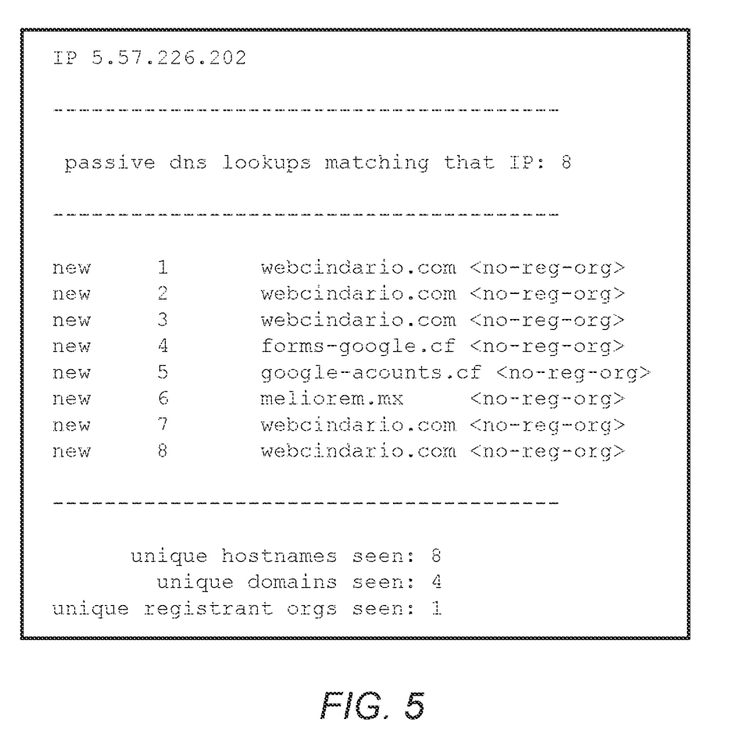
FIG. 5 illustrates an example of multiple domains with a single indicated registrant in accordance with some embodiments.

Referring to FIG. 4, an example is shown of a passive DNS lookup for an IP address that returns only a single domain. Since only a single domain is associated with the IP address, the address is not considered to be an IP mass host. Referring to FIG. 5, another example is of a passive DNS lookup is shown. In this example, the DNS lookup for the IP address returns multiple (eight) domains. Since this IP address has multiple associated domains, it may be an IP mass host, depending upon the number of registrants associated with the identified domains.

After identifying the domains that map to the IP address during the look back period, the system performs a WHOIS lookup for each of the identified domains to identify the registrant for each of these domains (step 308). A WHOIS record contains all of the contact information associated with the person, group, or company that registers a particular domain name. Typically, each WHOIS record will contain information such as the name and contact information of the Registrant (who owns the domain), the name and contact information of the Registrar (the organization or commercial entity that registered the domain name), the registration dates, the name servers, the most recent update, and the expiration date. WHOIS records may also provide the administrative and technical contact information (which is often, but not always, the registrant).

Ideally, the WHOIS lookup information for each domain will identify the registrant, although it should be noted that the registration information for some domains may be incomplete, and may not identify corresponding registrants. For the domains that do include registrant information, some of the domains may have the same registrant, rather than having unique registrants for the different domains.

After the registrants for the domains hosted at the candidate IP address have been identified, the system determines whether there are more than a predetermined number, N, of unique registrants (step 310). In one embodiment, the predetermined number is one. If there are not two or more unique registrants for the domains, the candidate IP address is determined not to be an IP mass host (step 322). In this case, the IP address can legitimately be considered to be a bad IP address, and is maintained on the reputation list.

Referring again to the example of FIG. 4, there is only a single domain with a single registrant, so the IP address is not considered to be an IP mass host. As noted above, in the case of an IP address having only a single associated domain, there is only a single registrant, so it can be determined that the corresponding IP address is not an IP mass host without having to perform the WHOIS lookup to determine the registrant. Referring to the example of FIG. 5, the WHOIS lookup indicates that the same registrant is associated with each of the domains. Since there is only one unique registrant associated with the IP address, it is determined that the IP address is not an IP mass host.

Figure 6:
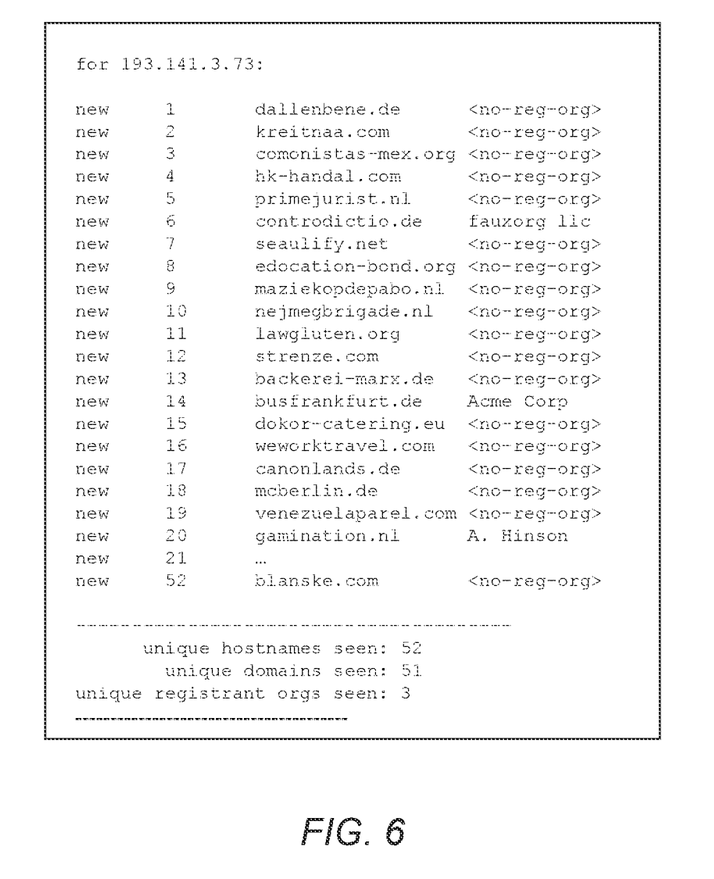
FIG. 6 illustrates an example of multiple domains with a multiple indicated registrants in accordance with some embodiments.

Referring to FIG. 6, another example of an IP address and associated domain and registrant information is shown. In this example, the passive DNS lookup resulted in the identification of 51 domains that map to the candidate IP address. When the WHOIS lookup is performed for the identified domains, three unique registrant organizations are identified. Since, in this embodiment, an IP address is considered to be an IP mass host if it is associated with two or more unique registrants, this IP address is deemed an IP mass host.

The step of determining whether there are more than a predetermined number of unique registrants is intended to prevent an IP address from being treated as an IP mass host if all of the hosted domains appear to be controlled by a single entity (a single registrant). If the domains have multiple, different registrants, it is more likely the case that the IP address may legitimately host good domains as well as bad domains, and should be considered to determine whether the IP mass host might actually be a good IP mass host. If, on the other hand all of the domains hosted at the IP address of the IP mass host have the same registrant, it is likely that the different domains are under common control, so if one of the domains is bad it is less likely that the others are legitimately good domains.

If, at step 310, it is determined that there are more than the predetermined number of unique registrants of the domains associated with the IP address (in this embodiment, if there are more than a single unique registrant), the candidate IP address is considered to be an IP mass host (step 312). In this case, it is desirable to determine whether the candidate IP address is a good IP mass host, or a bad IP mass host. To achieve this, the system identifies which of the domains that are hosted at the candidate IP address are bad domains (step 314). The number of bad domains is determined in relation to the total number of domains that are hosted at the candidate IP address, and it is determined whether the bad domains comprise more than a predetermined percentage of the total domains that are hosted at this address (step 316).

If the percentage of the domains hosted at the candidate IP address is greater than the predetermined percentage, it is determined that the IP address is a bad IP mass host (step 318), and the IP address is retained on the reputation list (step 320). Customers using the reputation list to block bad domains can therefore continue to block domains associated with this IP address with increased confidence that the blocked domains are more likely to be bad domains, and that there is less likelihood that good domains will be blocked. This helps to avoid the situation that many good domains are blocked as a result of the malicious or suspicious activity of a single bad domain which is hosted at the same IP address (keeping in mind that a single bad domain that is part of a smaller group of hosted domains will obviously comprise a larger percentage of the domains than if it is one of hundreds or thousands of domains at the same IP mass host).

If, at step 316, it is determined that the number of bad domains hosted at the candidate IP address is less than the predetermined percentage, then the candidate IP address is deemed to be a good IP mass host (step 324), and the candidate IP address is released from the reputation list (step 326). Thus, the process avoids situations in which a large number of good domains may be blocked as the result of a single bad domain (or very few bad domains) hosted at the IP address.

In some alternative embodiments, the method may be implemented in a system that has Secure Sockets Layer (SSL) enabled services. This system uses IP mass hosting style certificates which identify the associated domains. SSL Certificates are data files that digitally bind a cryptographic key to an organization's details to enable secure connections from a web server to a browser. IP mass hosting style certificates contain information including the domain names that are hosted by the IP address. In the event that IP mass hosting style certificates are available, the certificates can be accessed using OpenSSL queries to determine how many domains are associated with the IP address. OpenSSL is a commercial-grade toolkit for SSL and Transport Layer Security (TLS) protocols, and also provides a general-purpose cryptography library.

Figure 7:
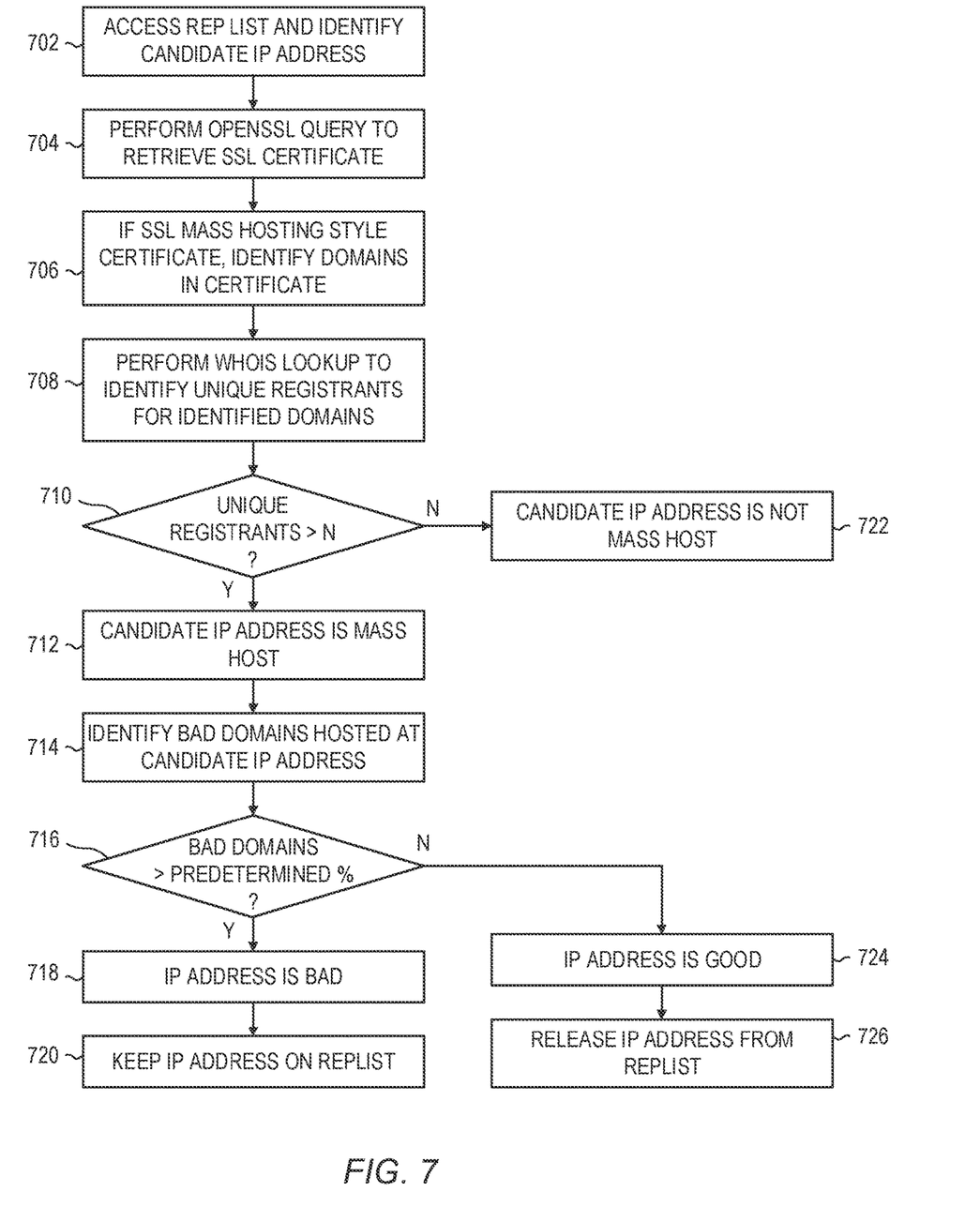
FIG. 7 is a flow diagram illustrating a method for method for identifying IP mass hosts and determining whether they are good or bad in accordance with some embodiments.

Referring to FIG. 7, a flow diagram illustrating a method for method for identifying IP mass hosts and determining whether they are good or bad in accordance with an alternative embodiment in an SSL enabled environment is shown. This method is similar to the method of FIG. 3, but uses the SSL certificates that are available in this environment to determine the domains associated with the IP address. This method begins by accessing a reputation list to identify a candidate IP address from the list (step 702). At step 704, an openssl query is performed to retrieve the SSL certificate associated with the candidate IP address. The query may, for example, have the following form:

openssl s_client-connect 157.185.172.22:443</dev/null 2>/dev/null|openssl x509-inform pem-text|grep-A1 "Subject Alternative Name"|we-|

If the certificate is a mass hosting style certificate, the domain names associated with the IP address are contained in the certificate, so the domain names can simply be read from the certificate (step 706). The SSL certificate retrieved using the example query includes domain information as shown below.

*.chinalive.com, *.dayjauy.net, *.5054399.com, *.aiwan4399.com, *.3839.com,
*.4399.cn, *.163.com, *.iwan4399.com, *.mitagtenni.net, *.ourdvsss.com,
*.3839app.com, *.bmwgroup.cn, *.unccodo.com, *.coviniya.com,
*.chidaress.com, *.foxijn.com, *.debence.net, *.syyx.com, *.livechina.cn,
*.ipanda.com, *.ipanda.net, *.iseeyoo.cn, *.cntvwb.cn, *.cntv.cn, *.cctvpic.com,
dl.jphbpk.gxpan.cn, m.bbs.3839.com, h5.selfiecity.meitu.com, *.v.2008.cctv.com, cdn.ssjj.iwan4399.com, upload.qf.56.com, *.vdn.app-s.cntv.cn, *.diary.my.cntv.cn, api.beautymaster.meiyan.com, h5.beautymaster.meiyan.com, api.selfiecity.meitu.com, pvmessage.cn.bmwgroup.com,
www.miniclip.com.4399pk.com After identifying the domains corresponding to the candidate IP address, the system performs a WHOIS lookup for each of the identified domains to identify the registrant for each of these domains (step 708). The system determines whether there are more than a predetermined number of unique registrants (step 710) for the identified domains. If the threshold number of unique registrants for the domains (e.g., two or more) is not met, the IP address is not considered to be an IP mass host, and is maintained on the reputation list (step 722). If the threshold number of unique registrants for the domains (e.g., two or more) is met, the candidate IP address is determined to be an IP mass host (step 712), and it is determined whether the candidate IP address is a good IP mass host, or a bad IP mass host.

This is done by identifying which of the domains hosted at the candidate IP address are bad domains (step 714). The number of bad domains is compared to the total number of domains hosted at the candidate IP address, and it is determined whether the bad domains are more than a predetermined percentage of the total domains (step 716). If the percentage of the hosted domains is greater than the predetermined percentage, the IP address is a bad IP mass host (step 718), and the IP address is retained on the reputation list (step 720). If the bad domains comprise less than the predetermined percentage of the total domains, the candidate IP address is deemed to be a good IP mass host (step 724), and the candidate IP address is released from the reputation list (step 726).

Figure 8:
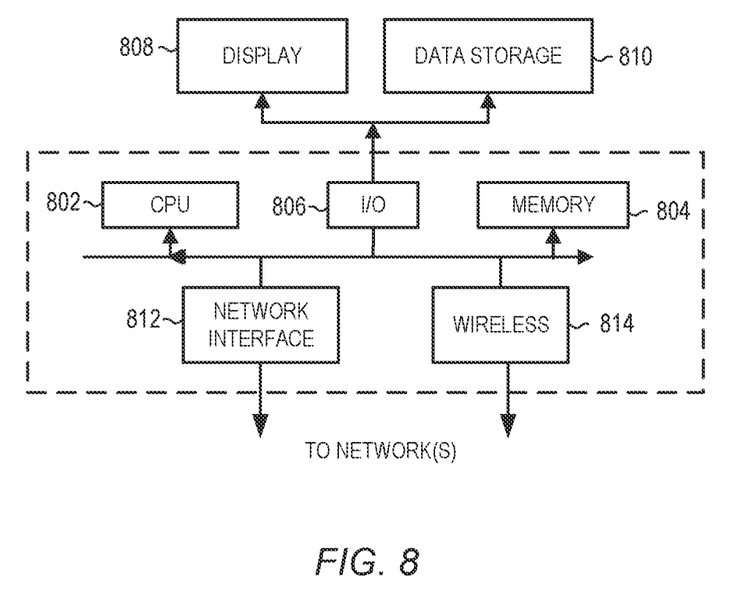
FIG. 8 is a block diagram illustrating an example of a computer structure in which some embodiments can be implemented.

Embodiments discussed herein can be implemented in a computer communicatively coupled to a network (for example, the Internet), another computer, or in a standalone computer. As illustrated in FIG. 8, a suitable computer can include a central processing unit ("CPU") 802, a computer memory 804 such as a read-only memory ("ROM"), random access memory ("RAM"), hard drive ("HD"), and one or more input/output ("I/O") device(s) 806. The I/O devices, which can be coupled to a display 808 and a data storage device 810, can include a keyboard, monitor, printer, electronic pointing device (for example, mouse, trackball, stylus, touch pad, etc.), or the like. In embodiments of the invention, the computer has a network interface 812 and a wireless component 814 for communicating with other computing devices over various types of networks.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

It should be understood that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure. It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A method for identifying whether an Internet Protocol (IP) address is an IP Mass Host, the method comprising:
   selecting a first candidate IP address;
   identifying a plurality of domains hosted at the first candidate IP address;
   identifying one or more registrants of the plurality of domains;
   determining a number of unique registrants within the one or more registrants of the plurality of domains;
   determining that the number of unique registrants exceeds a threshold number; and
   in response to determining that the number of unique registrants exceeds the threshold number,
      identifying ones of the plurality of domains that have bad reputations,
      determining that the identified ones of the plurality of domains that have bad reputations comprise at least a threshold percentage of the plurality of domains, and
      in response to determining that the identified ones of the plurality of domains that have bad reputations comprise at least the threshold percentage of the plurality of domains, storing an indication that the first candidate IP address is a bad mass host.

2. The method of claim 1, wherein selecting the first candidate IP address comprises accessing a release candidate list containing a plurality of IP addresses and selecting the first candidate IP address from the plurality of IP addresses.

3. The method of claim 2, further comprising, prior to selecting the first candidate IP address from the release candidate list, compiling the release candidate list from a bad reputation list containing IP addresses that have been identified as having bad reputations.

4. The method of claim 3, wherein storing the indication that the first candidate IP address is a bad mass host comprises maintaining the first candidate IP address on the bad reputation list.

5. The method of claim 3, in response to determining that the identified ones of the plurality of domains that have bad reputations comprise less than the threshold percentage of the plurality of domains, removing the first candidate IP address from the bad reputation list.

6. The method of claim 1, wherein identifying the plurality of domains hosted at the first candidate IP address comprises accessing domain name service (DNS) records and identifying domains that map to the first candidate IP address.

7. The method of claim 6, wherein the DNS records cover a defined look back period and the identified domains include only domains that map to the first candidate IP address during the defined look back period.

8. The method of claim 1, wherein identifying the plurality of domains hosted at the first candidate IP address comprises examining an IP mass hosting style certificate corresponding to the first candidate IP address, wherein the IP mass hosting style certificate contains information identifying the plurality of domains.

9. The method of claim 1, wherein identifying the one or more registrants of the plurality of domains comprises performing a WHOIS lookup for each of the plurality of domains and identifying from retrieved WHOIS information registrants corresponding to the plurality of domains.

10. The method of claim 1, wherein the threshold number comprises 1.

11. The method of claim 1, in response to determining that the number of unique registrants exceeds the threshold number, storing an indication that the first candidate IP address is an IP mass host.

12. A system comprising:
   a processor coupled to a memory that stores one or more instructions, the instructions executable by the processor to perform:
      selecting a first candidate Internet Protocol (IP) address;
      identifying a plurality of domains hosted at the first candidate IP address;
      identifying one or more registrants of the plurality of domains;
      determining a number of unique registrants within the one or more registrants of the plurality of domains;
      determining that the number of unique registrants exceeds a threshold number; and
      in response to determining that the number of unique registrants exceeds the threshold number,
         identifying ones of the plurality of domains that have bad reputations,
         determining that the identified ones of the plurality of domains that have bad reputations comprise at least a threshold percentage of the plurality of domains, and in response to determining that the identified ones of the plurality of domains that have bad reputations comprise at least the threshold percentage of the plurality of domains, storing an indication that the first candidate IP address is a bad mass host.

13. The system of claim 12, wherein selecting the first candidate IP address comprises accessing a release candidate list containing a plurality of IP addresses and selecting the first candidate IP address from the plurality of IP addresses.

14. The system of claim 12, wherein identifying the plurality of domains hosted at the first candidate IP address comprises accessing domain name service (DNS) records and identifying domains that map to the first candidate IP address.

15. The system of claim 12, wherein identifying the plurality of domains hosted at the first candidate IP address comprises examining an IP mass hosting style certificate corresponding to the first candidate IP address, wherein the IP mass hosting style certificate contains information identifying the plurality of domains.

16. The system of claim 12, wherein identifying the one or more registrants of the plurality of domains comprises performing a WHOIS lookup for each of the plurality of domains and identifying from retrieved WHOIS information registrants corresponding to the plurality of domains.

17. A computer program product comprising a non-transitory computer-readable medium storing instructions executable by one or more processors to perform:
   selecting a first candidate Internet Protocol (IP) address;
   identifying a plurality of domains hosted at the first candidate IP address;
   identifying one or more registrants of the plurality of domains;
   determining a number of unique registrants within the one or more registrants of the plurality of domains;
   determining that the number of unique registrants exceeds a threshold number; and
   in response to determining that the number of unique registrants exceeds the threshold number,
      identifying ones of the plurality of domains that have bad reputations,
      determining that the identified ones of the plurality of domains that have bad reputations comprise at least a threshold percentage of the plurality of domains, and
      in response to determining that the identified ones of the plurality of domains that have bad reputations comprise at least the threshold percentage of the plurality of domains, storing an indication that the first candidate IP address is a bad mass host.

18. The computer program product of claim 17, wherein identifying the plurality of domains hosted at the first candidate IP address comprises accessing domain name service (DNS) records and identifying domains that map to the first candidate IP address.

19. The computer program product of claim 17, wherein identifying the plurality of domains hosted at the first candidate IP address comprises examining an IP mass hosting style certificate corresponding to the first candidate IP address, wherein the IP mass hosting style certificate contains information identifying the plurality of domains.

20. The computer program product of claim 17, wherein identifying the one or more registrants of the plurality of domains comprises performing a WHOIS lookup for each of the plurality of domains and identifying from retrieved WHOIS information registrants corresponding to the plurality of domains.

\* \* \* \* \*